United States Patent [19]

Idel et al.

[11] Patent Number: 4,631,336

[45] Date of Patent: Dec. 23, 1986

[54] PROCESS FOR THE PRODUCTION OF HIGH MOLECULAR WEIGHT, OPTIONALLY BRANCHED POLYARYLENE SULPHIDE WITH AN ESTER OR ANHYDRIDE OF A CARBOXYLIC ACID

[75] Inventors: Karsten Idel, Krefeld; Edgar Ostlinning, Duesseldorf; Dieter Freitag, Krefeld, all of Fed. Rep. of Germany

[73] Assignee: Bayer Aktiengesellschaft, Leverkusen, Fed. Rep. of Germany

[21] Appl. No.: 761,369

[22] Filed: Aug. 1, 1985

[30] Foreign Application Priority Data

Aug. 7, 1984 [DE] Fed. Rep. of Germany ....... 3428986

[51] Int. Cl.$^4$ ............................................. C08G 75/16
[52] U.S. Cl. ..................................................... 528/388
[58] Field of Search ......................................... 528/388

[56] References Cited

U.S. PATENT DOCUMENTS

| | | | |
|---|---|---|---|
| 3,919,177 | 11/1975 | Campbell | 528/388 |
| 4,038,261 | 7/1977 | Crouch et al. | 528/388 |
| 4,116,947 | 9/1978 | Edmonds et al. | 528/388 |
| 4,413,083 | 11/1983 | Davies | 528/388 |

*Primary Examiner*—Harold D. Anderson
*Attorney, Agent, or Firm*—Connolly and Hutz

[57] ABSTRACT

This invention relates to a process for the production of high molecular weight, optionally branched polyarylene sulphides from alkali metal sulphides and halogenated aromatic compounds in the presence of from 0.5 to 100 mol %, based on the molar quantity of aromatic dihalogen compounds, of an ester or anhydride of a carboxylic acid.

15 Claims, No Drawings

PROCESS FOR THE PRODUCTION OF HIGH MOLECULAR WEIGHT, OPTIONALLY BRANCHED POLYARYLENE SULPHIDE WITH AN ESTER OR ANHYDRIDE OF A CARBOXYLIC ACID

This invention relates to a process for the production of high molecular weight, optionally branched polyarylene sulphides from alkali metal sulphides and halogenated aromatic compounds in polar organic solvents, wherein from 0.5 to 100 mol-%, preferably from 2 to 50 mol-%, based on the mols of aromatic dihalogen compounds, of esters and/or anhydrides of carboxylic acids are added to the reaction mixture.

Polyarylene sulphides and methods for the production thereof are known (see, for example, U.S. Pat. Nos. 2,513,188; 3,117,620; 3,354,129; 3,524,835; 3,790,536; 3,839,301; 4,048,259; 4,038,260; 4,038,261; 4,038,262; 4,056,515; 4,060,520; 4,064,114; 4,116,947 and 4,282,347, DE-AS Nos. 2,453,485 and 2,453,749, and DE-OS Nos. 2,623,362; 2,623,363; 2,263,333; 2,930,797; 2,930,710; 3,019,732 and 3,030,488.

Some of these publications describe the addition of inorganic or organic salts to the reaction mixture to lower the melt flow or increase the melt viscosity of the polyphenylene sulphides obtained. It is only when the melt viscosity is sufficiently high that polyphenylene sulphides may be worked-up thermoplastically, e.g. to produce injection moulded parts, foils and fibres. Without the addition of the above-mentioned salts, the polyphenylene sulphides obtained may only acquire the necessary low melt flow by a separate, additional after-condensation or hardening (curing).

Polyarylene sulphides having high melt viscosities are obtained by the process according to DE-OS No. 3,120,538. This process is carried out in the presence of a combination of N-alkyl lactams and N,N-dialkyl-carboxylic acid amides.

The following are examples of the salts used in the above-mentioned publications: alkali metal carboxylates (DE-AS No. 2,453,749), lithium halides or alkali metal carboxylates (DE-OS No. 2,623,362), lithium chloride or lithium carboxylate (DE-OS No. 2,623,363), alkali metal carbonates in combination with alkali metal carboxylates (U.S. Pat. No. 4,038,259), lithium acetate (DE-OS No. 2,623,333), trialkali metal phosphates (DE-OS No. 2,930,710), trialkali metal phosphonates (DE-OS No. 2,930,797), alkali metal fluorides (DE-OS No. 3,019,732), alkali metal sulphonates (U.S. Pat. No. 4,038,260), and lithium carbonate and lithium borate (U.S. Pat. No. 4,039,518).

It has now been found that high molecular weight, optionally branched polyarylene sulphides having a high melt viscosity may be obtained directly from the reaction without additional curing if esters or anhydrides of carboxylic acids are added to the reaction mixture.

The present invention thus relates to a process for the production of optionally branched polyarylene sulphides from:

(a) from 50 to 100 mol-% of aromatic dihalogen compounds corresponding to the following general formula:

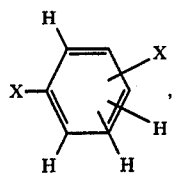

and from 0 to 50 mol-% of aromatic dihalogen compounds corresponding to the following general formula:

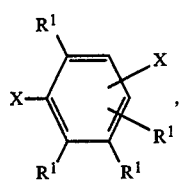

wherein

X represents halogen, such as chlorine or bromine, in meta- or para-position to each other; and $R^1$, which may be the same or different, represents hydrogen, $C_1$–$C_4$ alkyl, $C_5$–$C_{10}$ cycloalkyl, $C_6$–$C_{10}$ aryl, $C_7$–$C_{14}$ alkylaryl or $C_7$–$C_{14}$ arylalkyl, in which two $R^1$ groups in the ortho-position to each other may be joined together to form an aromatic or heterocyclic ring containing up to three hetero atoms, such as N, O, or S, and one of the groups $R^1$ is invariably different from hydrogen; and (b) from 0 to 5 mol-%, preferably from 0.1 to 2.5 mol-%, based on the sum of aromatic dihalogen compounds (I) and (II), of an aromatic tri- or tetra-halogen compound corresponding to the following general formula:

$$ArX_n \hspace{2cm} (III)$$

wherein

Ar represents an aromatic or heterocyclic group:

X represents halogen, such as chlorine or bromine; and n represents the number 3 or 4; and (c) alkali metal sulphides, preferably sodium or potassium sulphide or mixtures thereof, preferably in the form of hydrates or aqueous mixtures, optionally together with alkali metal hydroxides, such as sodium or potassium hydroxide; in which the molar ratio of (a+b):c may be from 0.5:1 to 1.5:1, preferably from 0.75:1 to 1.25:1; in (d) an organic solvent, characterised in that from 0.5 to 100 mol-%, preferably from 2 to 50 mol-%, based on the mols of aromatic dihalogen compounds (I) and (II), of an ester or anhydride of a carboxylic acid are added to the reaction mixture. The molar ratio of alkali metal sulphides (c) to organic solvent (b) should be from 1:1.5 to 1:15.

The reaction time may be up to 24 hours and is preferably from 2 to 18 hours. The reaction temperatures are from 150° to 280° C. The reaction may be carried out by various methods.

The alkali metal sulphides are preferably put into the process in the form of hydrates and aqueous mixtures or aqueous solutions. Dehydration may be carried out partially or completely by either first dehydrating the alkali metal sulphides in a preliminary step with the organic solvent and the ester or anhydride of the carboxylic acid without the presence of the aromatic dihalogen and/or polyhalogen compounds, but optionally with the aid of a component for forming an azeotropic mixture or a water carrier, such as toluene, or directly dehydrating the whole reaction mixture, in which case the aromatic dihalogen and polyhalogen compounds, for example, may serve as components for forming an azeotropic mixture.

If dehydration is only carried out partially, the pressure should be adjusted so that the required reaction temperatures may be obtained. The alkali metal sulphides could, if desired, by dehydrated on their own by application of a suitable temperature under vacuum and then added to the reaction mixture.

In the case of complete dehydration, which is preferably carried out in the presence of all the reaction components and with the aromatic dihalogen and polyhalogen compounds being used as water carriers, the reaction may be carried out pressure-free or at only a low pressure. Elevated pressures of up to 50 bar may be employed for the purpose of obtaining elevated reaction temperatures above the boiling point of the solvent or of the mixture of solvent and aromatic di- and poly-halogen compounds.

Various procedures may be employed for bringing the reactants together.

The reactants may all be directly added together or one or more of the reactants may be added continuously or portion-wise.

Working-up the reaction mixture and isolating the polyarylene sulphides may be carried out by known methods.

The polyarylene sulphide may be separated from the reaction solution by the conventional methods, such as filtration or centrifugation, either directly or, for example, after the addition of water and/or dilute acids or organic solvents, preferably solvents which have only a low dissolving power for polyarylene sulphides. The polyarylene sulphide is generally washed with water after it has been separated, although it may also be washed or extracted with other liquids in addition to or after this washing with water.

The polyarylene sulphide may also be isolated, for example, by removal of the solvent by distillation, followed by washing as described above.

The esters and anhydrides used according to the present invention may be esters and anhydrides of aliphatic or aromatic mono-, di- and poly-carboxylic acids. $C_2$–$C_{12}$ aliphatic or $C_5$–$C_7$ cycloaliphatic or $C_6$–$C_{14}$ aromatic mono-, di- and poly-carboxylic acid groups may carry substituents, such as $C_6$–$C_{12}$ aryl, $C_1$–$C_4$ alkyl, $C_5$–$C_{10}$ aryloxy, $C_1$–$C_4$ alkoxy or $C_5$–$C_{10}$ cycloalkoxy groups.

The anhydrides and esters may be in an intramolecular or intermolecular form. Mixed anhydrides, for example, may also be used. The alcohol moiety of the esters corresponds to the formula $OR_2$, wherein $R_2$ represents a $C_1$–$C_{18}$ alkyl, $C_5$–$C_{10}$ cycloalkyl or $C_7$–$C_{19}$ alkylaryl group.

The following are examples of suitable esters: methyl acetate, ethyl acetate, n-propyl acetate, n-butyl acetate, n-amyl acetate, isobutyl acetate, t-butyl acetate, isoamyl acetate, methyl propionate, ethyl propionate, methyl n-butyrate, ethyl n-butyrate, n-propyl butyrate, isoamyl n-butyrate, methyl n-valerate, ethyl n-valerate, methyl isovalerate, ethyl isovalerate, ethyl n-heptanoate, ethyl pelargonate, methyl benzoate, ethyl benzoate, n-propyl benzoate, n-butyl benzoate, diethyl phthalate, dimethyl oxalate, diethyl oxalate, dimethyl malonate, cyclohexane carboxylic acid methyl ester and cyclohexane carboxylic acid ethyl ester.

The following are examples of suitable carboxylic acid anhydrides: acetic acid anhydride, propionic acid anhydride, n-butyric acid anhydride, n-valeric acid anhydride, succinic acid anhydride, glutaric acid anhydride, benzoic acid anhydride, cyclohexane carboxylic acid anhydride and phthalic acid anhydride.

Mixtures of esters, mixtures of anhydrides and mixtures of esters with anhydrides may be used.

Sodium and potassium sulphide are examples of suitable alkali metal sulphides. The alkali metal sulphides may be obtained from $H_2S$ and alkali metal hydroxides or from hydrogen sulphides and alkali metal hydroxides.

If the reaction solution is contaminated with alkali metal hydrosulphide, e.g. because it has been introduced as an impurity with the alkali metal sulphide or has been formed in the course of the reaction, the alkali metal sulphide may be regenerated by the addition of a further quantity of alkali metal hydroxide according to the amount of alkali metal hydrosulphide present. If desired, compounds which release or form alkali metal hydroxides under the reaction conditions may be added instead of alkali metal hydroxides.

Aromatic meta- and para-dihalogen compounds corresponding to the general formula (I) or (II) may be used according to the present invention. The proporation of meta- to para-dihalogen compounds may in that case be up to 30:70.

For obtaining polyphenylene sulphides which may be worked thermoplastically, it is preferred to use aromatic para-dihalogen compounds.

If branched polyarylene sulphides are to be produced, it is necessary to use at least 0.05 mol-% of an aromatic trihalogen or tetrahalogen compound corresponding to general formula (III).

The following are examples of aromatic dihalogen compounds (I) to be used according to the present invention: p-dichlorobenzene, p-dibromobenzene, 1-chloro-4-bromobenzene, 1,3-dichlorobenzene, 1,3-dibromobenzene, 1-chloro-3-bromobenzene and 1-chloro-3-bromobenzene. These dihalogen compounds may be used singly or as mixtures. 1,4-dichlorobenzene and/or 1,4-dibromobenzene are particularly preferred.

The following are examples of aromatic dihalogen compounds (II) to be used according to the present invention: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl 2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. These may be used singly or as mixtures.

The following are examples of aromatic tri- and tetrahalogen compounds (III) to be used according to the present invention: 1,2,3-trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4- tetrachloronaphthalene, 1,2,4,5-tetrachlorobenzene, 2,2',4,4'-tetrachlorobiphenyl and 1,3,5-trichlorotriazine.

As a general rule, various polar solvents, which provide sufficient solubility for the organic and optionally also inorganic reactants under the reaction conditions may be used for the reaction, but cyclic ureas and lactams are preferred, particularly N-alkyl lactams.

The following are examples of suitable solvents: N-methyl-caprolactam, N-ethyl-caprolactam, N-isopropylcaprolactam, N-isobutyl-caprolactam, N-propyl-caprolactam, N-butyl-caprolactam, N-cyclohexyl-caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxo-hexamethylene imine, and N-ethyl-2-oxo-hexamethylene imine.

Mixtures may be selected from the above-mentioned solvents.

The polyarylene sulphides according to the present invention may be mixed with other polymers, such as pigments and fillers, e.g. graphite, metal powder, glass powder, quartz powder, glass fibres or carbon fibres, or they may be used together with the conventional additives for polyarylene sulphides, such as the conventional stabilizers or mould release agents.

The melt flow of polyarylene sulphides is generally determined according to ASTM 1238-70 at 316° C., using a 5 kg weight, and given in g/10 minutes.

If the melt flow is high, however, this measurement may give rise to difficulties owing to the high outflow rate of the polymer melt.

The melt viscosity nm of the polymer melt was therefore determined (in Pa.s) at 306° C. in dependence upon the shear stress $\tau$ (in Pa) by means of an Instron Rotation viscosimeter.

By this method, the melt viscosity may be determined over a very wide range of from $10^{-1}$ to $10^7$ Pa.s. In the Instron Rheometer, the polymer is melted between a fixed plate and a rotatable cone and the torque of the cone is determined. The melt viscosity in dependence upon the shear stress may be calculated from the torque, the angular velocity and the data of the apparatus. Rheometer Model 3250 of Instron with cone and plate having a diameter of 2 cm was used.

The result was given as the melt viscosity determined at a shear stress of $\tau = 10^2$ Pa.

It is also possible to analyse the polyarylene sulphides with chromatographic methods, to get informations about their molecular weight and the molecular weight distribution. Typical examples for such methods are for example high pressure liquid chromatography (HPLC), gel permeation-chromatography (GPC).

As the stationary phase may be used common commercial carrier materials, for example Li-Chroprep ®, Lobar ®, LiChrosorb ®, LiChrospher ®, Perisorb ®, Hibar ®, Fractogel ®, Fractosil ®, Ultrastyragel ®, Microstyragel ®, Zorbax ®, Bondagel ® and Shodex ®.

As solvents and eluents may be used common solvents and diluents. These solvents and diluents should dissolve the polymers sufficient. Examples are 1-chloronaphthalene, diphenyl, N-methyl-pyrrolidone, N-cyclohexyl-pyrrolidone, N-methyl-piperidone, N-methyl-caprolactame, N-methyl-laurinelactam, sulfolane, N,N'-dimethyl-imidazolidone, N,N'-dimethylpiperazinone, hexamethyl-phosphoric-acid-triamide (NMP), 1-methyl-1-oxaphospholane and mixtures thereof.

It is possible to calibrate the analytical methods by absolute or relative standards. As reference substances for a relative calibration, usual polymers may be used as standard, for example, polystyrene, polyethylene, polyethylene-terephthalate, polybutylene-terephthalate, polyesters such as aromatic polyesters, polycarbonates, polyamides such as PA6, PA66, PA11, polysulfones and polyethersulfones.

The chromatography for the analytical determination of the molecular weights or the molecular weight distribution can be carried out at various pressures from about 1 to 10 bar.

The chromatography can be carried out within a wide temperature range from about 20° to 250° C.

Further it is possible for improvement purposes to add to the sample, which has to be analyzed, substances such as alkali halogenides, alkaline earth halogenides, phosphonium- or ammonium compounds.

By the interpretation of the so obtained analytical status, the weight average molecular weight $M_w$ can be determined.

The weight average molecular weight $M_w$ is from 25,000 to 500,000, preferably from 25,000 to 380,000, more preferably from 25,000 to 300,000, mostly preferably from 25,000 to 150,000.

According to the present invention are obtained polyarylene-sulphides with a melt viscosity of $\eta_m$ 20 to 500,000 Pa.s and an average weight relative molecular weight $M_w$(rel) from 25,000 to 500,000 characterized in that the melt viscosity $\eta_m$ and the average weight of the relative molecular weight $M_w$ behave $$\lg \eta_m = 3.48 \cdot \lg M_w(\text{rel}) - 14.25 \pm 0.1.$$

Preferably polyarylene-sulphides are characterized in that $\eta_m$ and $M_w$ behave $$\lg \eta_m = 3.48 \cdot \lg M_w(\text{rel}) - 14.25 \pm 0.05.$$

The polyarylene sulphides according to the present invention, preferably p-polyarylene sulphides, generally have melt viscosities of from $0.3 \times 10^3$ to $5 \times 10^6$ Pa.s, preferably from $1.5 \times 10^3$ to $10^4$ Pa.s, immediately after isolation from the reaction mixture, and good colour characteristics. They may be directly worked-up into foils, moulded parts or fibres by extrusion, extrusion blowing, injection moulding or other conventional processing techniques. The products obtained may be used for the conventional purposes, e.g. as parts in motor vehicles, dashboards, electrical parts, such as switches or electronic panels, chemically-resistant and weather-resistant parts and apparatus, such as pump housings and pump impellers, dishes for etching baths, sealing rings, parts of office machines and Telex equipment, domestic apparatus, valves and ball bearing parts.

COMPARISON EXAMPLE

Production of polyphenylene sulphide according to U.S. Pat. No. 3,354,129.

129 g of sodium sulphide trihydrate ($\hat{=} 1$ mol Na$_2$S) and 330 g of N-methyl pyrrolidone were added together in an autoclave equipped with stirrer. The mixture was flushed with nitrogen and slowly heated to 202° C. 19 ml of water distilled off in the process (corresponding to a residual water content of 1.78 mol, based on the sodium sulphide). The reaction mixture was then cooled to about 160° C., and 147 g of p-dichlorobenzene (=1 mol) in about 50 g of methyl pyrrolidone were added. The reaction mixture was heated to 245° C. under a preliminary nitrogen pressure of 2.5 bar for 30 minutes and maintained at this temperature for 3 hours. The final pressure obtained was 14.5 bar. A grey solid was isolated after cooling to room temperature and this solid was washed with water. 100.3 g (=93%) of poly-p-phenylene sulphide were obtained after drying under vacuum at 80° C. This product was light brown in colour and had a melt viscosity of $\eta m = 4.5$ Pa.s (at $\tau = 10^2$ Pa).

Thermoplastic processing is not possible without curing.

EXAMPLE 1

This Example describes the production of polyphenylene sulphide according to U.S. Pat. No. 3,354,129 for comparison.

129 g of sodium sulphide trihydrate (corresponding to 1 mol of Na$_2$S) and 300 g of N-methyl-2-pyrrolidone were introduced into an autoclave equipped with a stirrer. The mixture was flushed with nitrogen and slowly heated to 202° C. 19 ml of water distilled off in the process. The reaction mixture was then cooled to about 160° C. and 147 g of p-dichlorobenzene (=1 mol) in about 50 g of N-methyl-2-pyrrolidone were then added. The reaction mixture was heated to 245° C. under a preliminary nitrogen pressure of 2.5 bar for 30 minutes, the pressure rising to 10 bar during this time, and the temperature was maintained at this level for 3 hours. After cooling to room temperature, a grey solid was isolated, which was subsequently carfeully washed with water to remove inorganic impurities.

After drying under vacuum at 80° C., 100.3 g (93%) of poly-p-phenylene sulphide having the following characteristics were obtained:

Melt viscosity $\eta m = 4.5$ Pa.s (at $\tau = 10^2$ Pa); thermoplastic processing was not possible without curing.

EXAMPLE 2

7.65 g of acetic acid anhydride (0.075 mol), 129.6 g of sodium sulphide trihydrate (1.0 mol Na$_2$S) and 300 g of N-methyl-2-pyrrolidone were slowly heated to 176° C. in an autoclave equipped with a stirrer and a distillation attachment. 6 ml of distillate consisting mostly of water were collected. Sodium hydrogen sulphide present in the reaction mixture may be converted into sodium sulphide by the addition of a suitable quantity of sodium hydroxide (powder), the water formed as a result of this neutralisation being removed in the course of distillation.

142.6 g of p-dichlorobenzene (0.97 mol) and 1.4 g of 1,2,4-trichlorobenzene (0.08 mol) in 120 g of N-methyl-2-pyrrolidone were then added and the reaction mixture was heated from 200° C. to 240° C. in the course of 90 minutes and maintained at this temperature for 300 minutes. After the end of the reaction, the reaction mixture is left to cool to 150° C., the pressure is released and the reaction mixture is removed. The p-polyphenylene sulphide obtained is isolated by the addition of water containing the required quantity of hydrochloric acid to neutralise basic constituents in the reaction mixture, followed by filtration. The reaction product is washed free from electrolytes with water and then optionally briefly washed with ethanol. After drying, p-polyphenylene sulphide is obtained as a grey white solid.

Melt viscosity $\eta m = 2.070$ Pa.s (at $\tau = 10^2$ Pa).

EXAMPLE 3

Same as Example 2, but using 0.1 mol = 13.01 g of propionic acid anhydride instead of acetic acid anhydride. The melt viscosity of the p-polyphenylene sulphide obtained was $\eta m = 1450$ Pa.s (determined at $10^2$ Pa).

EXAMPLE 4

Same as Example 2, but with the addition of 0.15 mol = 17.4 g of butyl acetate instead of the acetic acid anhydride. A p-polyphenylene sulphide having a melt viscosity of $\eta m = 1320$ Pa.s (determined at $10^2$ Pa) was obtained.

EXAMPLE 5

Same as Example 2, except that the reaction mixture was heated from 200° C. to 260° C. in 120 minutes and maintained at the higher temperature for 150 minutes. The greyish white p-polyphenylene sulphide obtained was isolated and worked-up as in Example 2.

$\eta m = 2600$ Pa.s (at $= 10^2$ Pa).

EXAMPLE 6

Same as Example 2, but using 0.7 g of the branching agent, 1,2,4-trichlorobenzene (0.04 mol).

$\eta m = 780$ Pa.s (determined at $10^2$ Pa).

EXAMPLE 7

1110 g of N-methyl-caprolactam, 305.2 g of sodium sulphide trihydrate (=2.32 mol), 27.8 g of 50% sodium hydroxide solution (0.348 mol), 341.1 g of 1,4-dichlorobenzene (=2.32 mol) and 2.1 g of 1,2,4-trichlorobenzene (0.5 mol-%, based on the mols of dichlorobenzene) were introduced under nitrogen into a 2 l three-necked flask equipped with thermometer, stirrer and distillation column with divider.

The reaction mixture was slowly heated to boiling. The water was separated from the azeotropic mixture of water and p-dichlorobenzene distilling off, and the p-dichlorobenzene was returned to the reaction mixture. Both the reaction mixture and the distillate appear to be free from water after 2 hours. Heating under reflux is continued for a further 3 hours and the product is isolated in the conventional manner. A white PPS (polyphenylene sulphide) is obtained after precipitation in water, neutralisation, washing with water and drying. The product has a melt viscosity of $\eta m = 1400$ Pa.s (determined at $10^2$ Pa).

All the p-polyphenylene sulphides obtained in Examples 2 to 7 may be directly worked-up thermoplastically.

We claim:

1. A process for the production of a high molecular weight polyarylene sulphide or branched polyarylene sulfide which comprises reacting a mixture of components of:
   (a) from 50 to 100 mol-% of an aromatic dihalogen compound corresponding to the following formula:

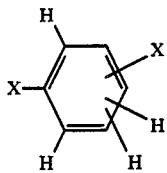

and from 0 to 50 mol-% of an aromatic dihalogen compound corresponding to the following formula:

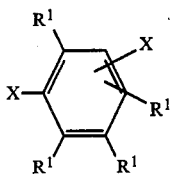

wherein

X represents halogens in the meta- or para-position to each other; and each $R^1$ is independently hydrogen, alkyl, cycloalkyl, aryl, alkylaryl, arylalkyl, or two groups $R^1$ in the orthoposition to each other joined together to form an aromatic or heterocyclic ring, with the proviso that at least one $R^1$ is not hydrogen; and (b) from 0 to 5 mol-%, based on the sum of components (a) and (b), of an aromatic tri- or tetra-halogen compound corresponding to the following formula:

$ArX^1_n$ wherein

Ar represents an aromatic or heterocyclic group;

$X^1$ represents chlorine or bromine; and n represents 3 or 4; and (c) an alkali metal sulphide, in which the molar ratio of (a+b):c is from 0.5:1 to 1.5:1; in (d) an organic solvent; in the presence of from 0.5 to 100 mol-%, based on the moles of aromatic dihalogen compounds (I) and (II), of (e) an ester or anhydride of a carboxylic acid.

2. A process according to claim 1, wherein (e) is an ester of a $C_2$–$C_{18}$ aliphatic or a $C_5$–$C_7$ cycloaliphatic carboxylic acid.

3. A process according to claim 1, wherein (e) is an anhydride of a $C_2$–$C_7$ aliphatic or a $C_5$–$C_7$ cycloaliphatic carboxylic acid.

4. A process according to claim 1 further comprising adding (f), a component which forms an azeotrope with water, to the reaction mixture, distilling all the water from the reaction mixture by means of forming an azeotrope with (f) and then reacting in the absence of pressure or under low pressure.

5. A process according to claim 1, wherein the reaction mixture is first partially dehydrated and then the reaction is carried out under pressure.

6. A process according to claim 1, wherein N-methylpyrrolidone-(2) is the organic solvent.

7. A process according to claim 1, wherein N-methylcaprolactam is the organic solvent.

8. A process according to claim 1, wherein 1,4-dichlorobenzene is the aromatic dihalogen compound.

9. A process according to claim 1, wherein 1,2,4-trichlorobenzene is the aromatic polyhalogen compound.

10. A process according to claim 1, wherein the alkali metal sulphide is added to the reaction mixture in the form of a hydrate, an aqueous mixture or an aqueous solution.

11. A process according to claim 1, wherein the alkali metal sulphide is sodium sulphide, potassium sulphide or mixtures thereof.

12. A process according to claim 1, wherein component (c) further comprises an alkali metal hydroxide.

13. A process according to claim 12, wherein the alkali metal hydroxide is sodium hydroxide or potassium hydroxide.

14. A process according to claim 1, wherein the molar ratio of (a+b):c is from 0.75:1 to 1.25:1.

15. A process according to claim 1, wherein the heterocyclic ring formed by the two groups $R^1$ contains an N, O or S atom.

* * * * *

UNITED STATES PATENT AND TRADEMARK OFFICE
CERTIFICATE OF CORRECTION

PATENT NO. : 4,631,336
DATED : December 23, 1986
INVENTOR(S) : Idel et al.

It is certified that error appears in the above-identified patent and that said Letters Patent are hereby corrected as shown below:

Column 5, line 38 "nm" should read --$\eta_m$--.

Column 6, line 5 "(NMP)" should read --(HMPT)--.

Please delete Column 6, line 63 through column 7, line 17.

Column 7, line 41, "$\eta m$" should read --$\eta_m$--.

Column 8, lines 5, 11, 19, 28, 34 and 55, in each instance, "$\eta m$" should read --$\eta_m$--.

Signed and Sealed this

Fourth Day of October, 1988

Attest:

DONALD J. QUIGG

Attesting Officer

Commissioner of Patents and Trademarks